United States Patent [19]
Ives et al.

[11] Patent Number: 5,971,465
[45] Date of Patent: Oct. 26, 1999

[54] TAILGATE RAMP SYSTEM

[76] Inventors: Michael Ives, 20 Great George Street, Charlottetown, Prince Edward Island, Canada, C1A 7L1; Felix Coady, P.O. Box 516, Marystown, Newfoundland, Canada, A0E 2M0

[21] Appl. No.: 09/033,057

[22] Filed: Mar. 2, 1998

[51] Int. Cl.⁶ .................................................. B60P 1/43
[52] U.S. Cl. ............................................ 296/61; 414/537
[58] Field of Search .............................. 296/61, 57.1, 51, 296/50; 414/537

[56] References Cited

U.S. PATENT DOCUMENTS

| | | |
|---|---|---|
| 3,510,015 | 5/1970 | Roshauen . |
| 3,737,058 | 6/1973 | Johnson ................................ 296/61 X |
| 3,756,440 | 9/1973 | Raap . |
| 4,003,483 | 1/1977 | Fulton .................................. 296/61 X |
| 4,884,838 | 12/1989 | Slater . |
| 4,923,360 | 5/1990 | Beauchemin . |
| 5,769,593 | 6/1998 | Buffaloe .................................... 414/537 |
| 5,813,714 | 9/1998 | Lipinski et al. ........................... 296/61 |

FOREIGN PATENT DOCUMENTS 1071811  2/1980  Canada .

*Primary Examiner*—Joseph D. Pape
*Attorney, Agent, or Firm*—Mario D. Theriault

[57] ABSTRACT

A tailgate ramp system comprising a pair of ramp members and an anchor bar which is removably attachable to the latch bolts or to the latch mechanisms on the tailgate of a pickup truck. The anchor bar of the present invention comprises a C-shaped, angle-iron structure having a stem member and two arm members pointing at right angles from the stem member, one at each extremity of the stem member. There is also provided an anchor rod affixed to the stem member for retaining the upper ends of the ramp members extending downward from the tailgate. In a first variant of the anchor bar, each arm member has an opening therein which corresponds in shape and location relative to the length of the stem to a configuration and spacing of one of the latch bolts on the tailgate relative to a width of the tailgate. In a second variant of the anchor bar, each arm member has a pin mounted thereon for engagement with pin-latching mechanisms of modern tailgates having such closures. These pins correspond in shape and location relative to the length of the stem member to a configuration and spacing of the pin-latching mechanisms relative to a width of the tailgate. The tailgate ramp system of the present invention including an anchor bar of a first or a second variant is thereby mountable on conventional tailgates having latch bolts or on newer tailgates having pin-latching mechanisms.

20 Claims, 3 Drawing Sheets

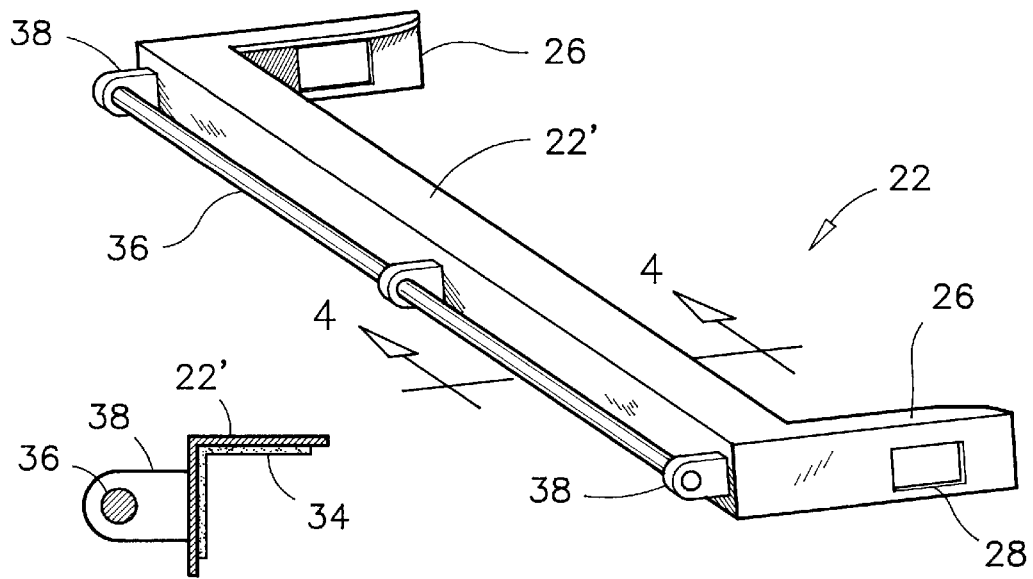
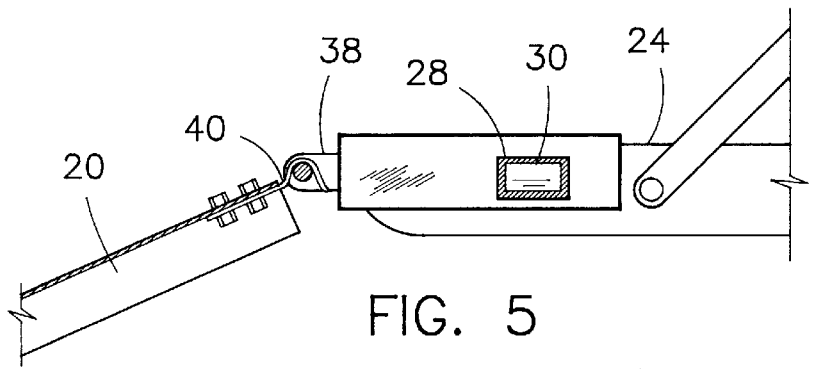
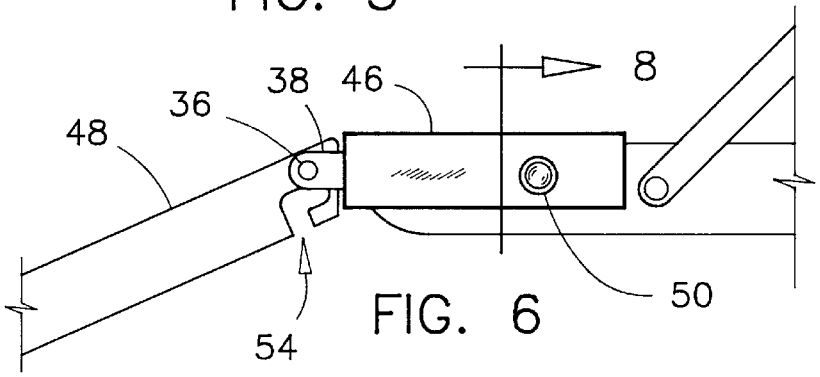
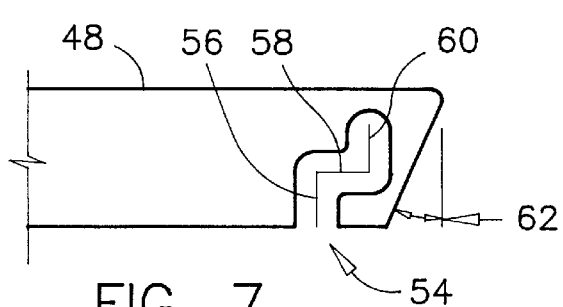
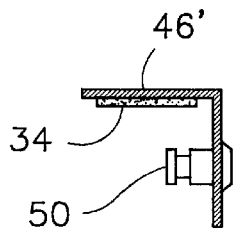

TAILGATE RAMP SYSTEM

FIELD OF THE INVENTION

The present invention relates to tailgate ramp systems for pickup trucks, and more particularly, the present invention relates to a tailgate ramp system having an anchor bar which is attachable to the latch bolts or to the latch mechanisms of the tailgate of the pickup truck.

BACKGROUND OF THE INVENTION

Portable ramps for pickup trucks are commonly used for loading garden tractors, snowmobiles, all-terrain vehicles and equipment of the like into the box of a pickup truck. It will be appreciated that conscientious users of portable ramps for pickup trucks know that it is preferable to secure the upper ends of the ramp members to the tailgate of the pickup truck in order to prevent accidents that can be caused by the slipping of a ramp member when equipment is being moved thereon.

Various systems have been developed in the past for retaining the upper end of a ramp member to the tailgate of a pickup truck. Some of the devices of the prior art require the use of fasteners through the tailgate. Other models are clamped on to the tailgate or frictionally engaged with the painted surfaces of the tailgate. In general, the use of ramp anchoring devices of the prior art is known to permanently alter to some degrees the visual quality of the tailgate.

Typical devices of the prior art include for example, a ramp system such as the one described in U.S. Pat. No. 3,510,015 issued on May 5, 1970 to Harold L. Roshaven. This ramp system comprises a pair of ramp members having hooks on their upper ends, and a pair of support members having U-shaped straps for retaining the hooks of the ramp members. The support members are clamped onto the tailgate by transversely encircling a major portion of the tailgate.

In other examples, U.S. Pat. No. 3,756,440 issued on Sep. 4, 1973 to joint inventors Gerald G. Raap and Donald F. Kutz describes a pair of ramp members which are pivotally connected to a round bar. The round bar is permanently affixed to the upper edge of the tailgate. U.S. Pat. No. 4,884,838 issued on Dec. 5, 1989 to Frank W. Slater describes another ramp member attached to an elongated cap covering the upper edge of a tailgate. The cap is permanently fastened to the upper edge of the tailgate with screws. U.S. Pat. No. 4,923,360 issued on May 8, 1990 to Phillippe J. Beauchemin illustrates a collapsible tailgate ramp which has an upper end pivotally connected to the upper edge of a tailgate. A last example of a portable tailgate ramp of the prior art is illustrated in Canadian Patent 1,071,811 issued on Feb. 19, 1980 to Lucien Leduc. The ramp described in this document has a pair of pins extending from an upper end thereof. These pins are engageable in corresponding holes through the tailgate.

It will be appreciated that some modem pickup trucks are as luxurious and comfortable as sedan cars. Therefore, a proud owner of a modem pickup truck generally does not want to permanently affix an anchor bar to the tailgate of his/her truck, or to install steel strap members across the painted surface of the tailgate. It is believed that this reality partly explains why the tailgate ramp systems of the prior art in general, have not been broadly used on modern pickup trucks.

SUMMARY OF THE INVENTION

In the present invention, however, there is provided a tailgate ramp system having an anchor bar which is removably attachable to the latch bolts or to the latch mechanisms on the tailgate of a pickup truck. The anchor bar is easily latched onto the tailgate by pushing it against the latch bolts or the latch mechanisms when the tailgate is in an open position. The anchor bar is removable from the tailgate by pulling the latch-release handle on the tailgate, and lifting the anchor bar off the upper edge of the tailgate. The installation of the tailgate ramp system of the present invention does not require any alteration to the tailgate itself.

In accordance to one aspect of the tailgate ramp system of the present invention, there is provided an anchor bar of a first variant for mounting on a tailgate having a pair of retractable latch bolts extending from the transversal edges of the tailgate. The anchor bar of the first valiant comprises a C-shaped structure having a stem member and two arm members pointing at right angle from the stem member, one at each extremity of the stem member. There is also provided an anchor rod affixed to the stem member for retaining the upper end of one or more ramp members extending downward from the tailgate.

The stem member has nominal dimensions corresponding to the nominal length and thickness of the longitudinal upper edge of the tailgate. Each arm member has a nominal surface for partly covering one of the transversal edges of the tailgate. The C-shaped structure is mountable over the longitudinal upper edge of the tailgate for at least partly enclosing the longitudinal upper edge and the transversal edges of the tailgate. Each arm member has an opening therein which corresponds in shape and location relative to the length of the stem, to a configuration and spacing of one of the latch bolts on the tailgate relative to the width of the tailgate.

The principal advantage of the anchor bar of the first variant is that when the anchor bar is mounted on the tailgate, the anchor bar is retainable to the tailgate by an engagement of the openings in the arm members with the latch bolts of the tailgate. Moreover, the anchor bar of the first variant is easily mountable on the tailgate by simply pushing the arm members against the latch bolts of the tailgate for causing the latch bolts to retract and snappily engage into the openings in the arm members. The anchor bar is easily removed from the tailgate by pulling the latch-release handle on the tailgate and causing the latch bolts to retract and to disengage from the openings in the arm members.

In accordance to a second aspect of the present invention, there is provided a second variant of an anchor bar for installation over a tailgate having a pin-latching mechanism on each side thereof. The anchor bar of the second variant has a pair of pins mounted on the arm members thereof. These pins correspond in shape and location relative to the length of the stem member to a configuration and spacing of the pin-latching mechanisms relative to the width of the tailgate. The tailgate ramp system of the present invention including an anchor bar of a first or a second variant is thereby mountable on conventional tailgates having latch bolts, or on newer tailgates having pin-latching mechanisms.

In accordance to yet another aspect of the present invention, The C-shaped structure of the anchor bar is made of angle iron, and is at least partly covered with soft padding material for preventing scratching the painted surfaces of the tailgate. Therefore, repeated uses of the anchor bar of the present invention do not deteriorate the surface finish of the tailgate.

In accordance to a further aspect of the tailgate ramp system of the present invention, each ramp member thereof is made of preformed metal decking strips having a tread surface and two flanges enclosing the tread surface and extending perpendicularly relative to the tread surface. There is also provided a pair of slots in the flanges near the upper end of the ramp member for retaining the ramp member to an anchor bar on the tailgate. Each of the slots further has a latch tab mounted across a bottom end thereof for selectively closing the bottom end of the slot and for preventing the ramp member from accidentally lifting or twisting out of its engagement with the anchor bar when the ramp member is being used.

The tailgate ramp system of the present invention, and particularly the anchor bar thereof is compact in size and easily installed, removed and stowed in the truck box or elsewhere. The tailgate ramp system of the present invention is of a simple construction manufacturable at a reasonable cost.

BRIEF DESCRIPTION OF THE DRAWINGS

The preferred embodiment of the present invention will be further understood from the following description, with reference to the drawings in which:

FIG. 3 is a perspective rear, top and right side view of the anchor bar of the tailgate ramp system of the first preferred embodiment;

FIG. 4 is cross-section view of the anchor bar along line 4—4 in FIG. 3;

FIG. 5 is a right elevation view of the tailgate ramp system of the first preferred embodiment, with the ramp member and the anchor rod shown in cross-section views;

FIG. 6 is a right elevation view of a tailgate ramp system of a second preferred embodiment;

FIG. 7 is an enlarged right side view of a ramp member of the second preferred embodiment;

FIG. 8 is a cross-section view of the anchor bar of the tailgate ramp system of the second preferred embodiment along line 8 in FIG. 6;

DETAILED DESCRIPTION OF THE PREFERRED EMBODIMENTS

The tailgate ramp system described herein comprises three variants which do not differ substantially from each other. Each variant comprises a pair of ramp members and an anchor bar for retaining the ramp members to the tailgate of a pickup truck. The variations referred to in the following disclosure are related to different configurations for securing the ramp members to the anchor bar and for securing the anchor bar to the tailgate of the pickup truck. Those skilled in the art will appreciate that the ramp members of one variant can be use with the anchor bar of another variant and vice-versa. Therefore, the following disclosure shall not be read as being a limitation in the possible arrangements of the described elements.

Figure 1:
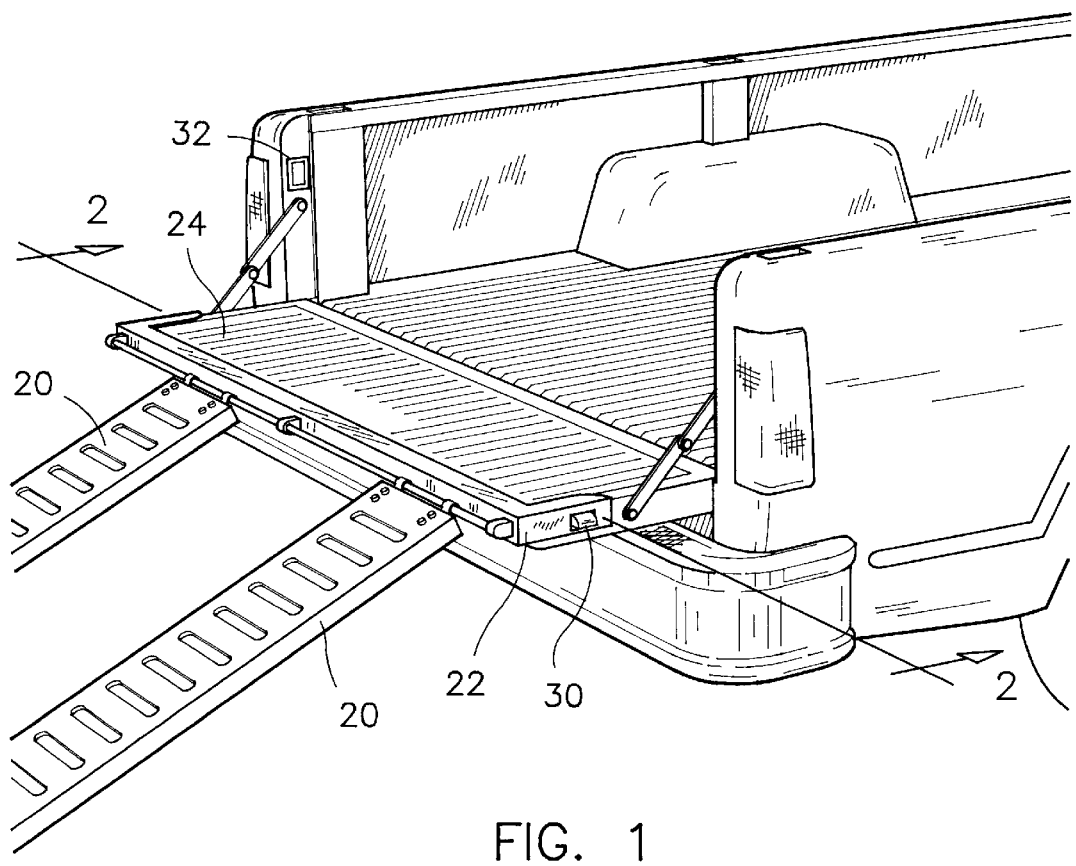
FIG. 1 is a perspective view of the tailgate ramp system of the first preferred embodiment in use on the tailgate of a pickup truck.
Figure 2:
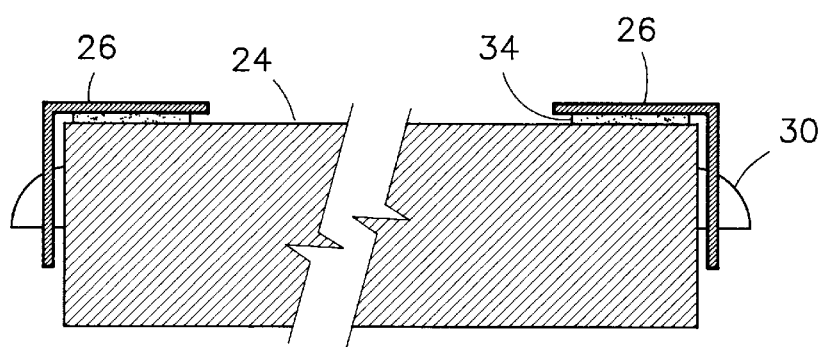
FIG. 2 is a cross-section view of the anchor bar of the tailgate ramp system of the first preferred embodiment as seen along line 2—2 in FIG. 1.
Figure 9:
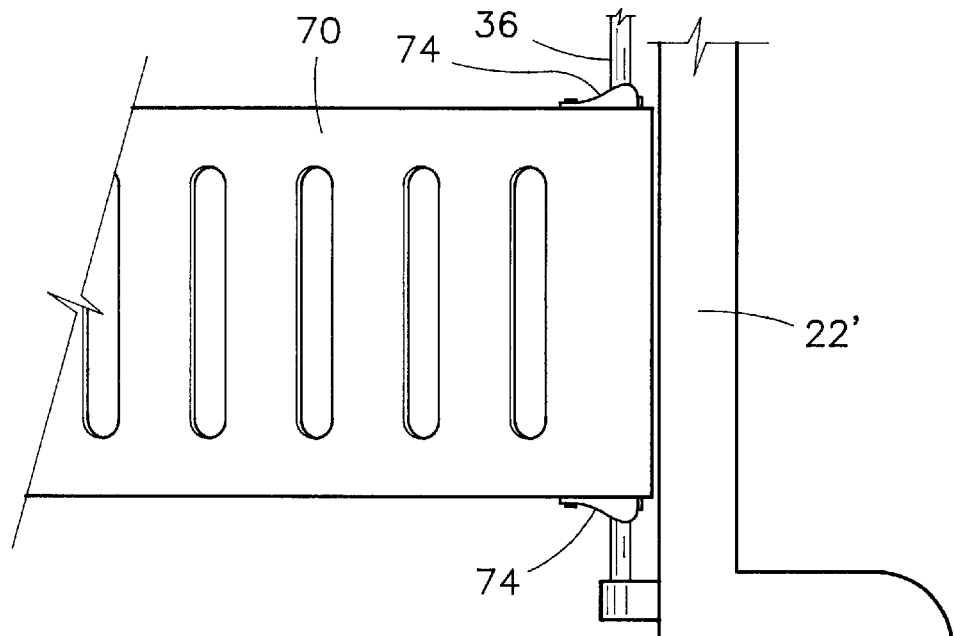
FIG. 9 is a plan view of a tailgate ramp system of the third preferred embodiment.
Figure 10:
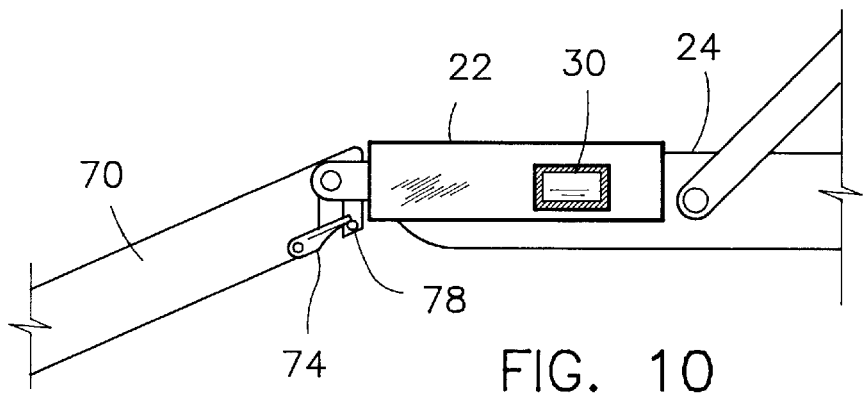
FIG. 10 is a right elevation view of the tailgate ramp system of the third preferred embodiment.
Figure 11:
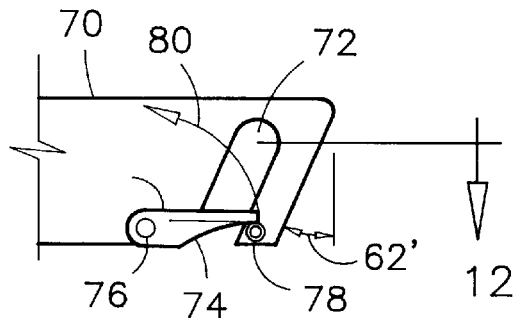
FIG. 11 is an enlarged right side view of the ramp member shown in FIG. 10.
Figure 12:
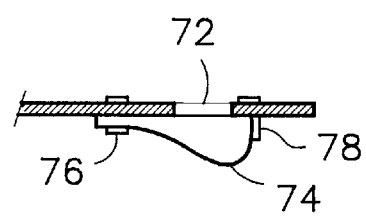
FIG. 12 is a cross-section view of the latch tab on the ramp member of the third preferred embodiment along line 12 in FIG. 11.

The tailgate ramp system of the first preferred embodiment is illustrated in FIGS. 1–5. The ramp members are labeled with numeral 20 and the anchor bar is labeled with numeral 22. Referring particularly to FIG. 3, the anchor bar 22 comprises a C-shaped member 22' made of angle iron and having dimensions to fit over the top edge of a tailgate 24 of a pickup truck. Each side piece 26 of the C-shaped member 22' has an opening 28 corresponding in shape and location to the shape and location of one of the latch bolts 30 on the tailgate 24. The tailgate 24 referred to herein is the type having a closure mechanism comprising a pair of rectangular latch bolts 30 and wherein the truck box has brackets 32 with rectangular openings for receiving the latch bolts 30, as illustrated in FIG. 1. It will be appreciated that the tailgate ramp system of the present invention is preferably manufactured in several models wherein each model is sized to fit a particular make and size of pickup truck.

The installation of the anchor bar 22 of the preferred embodiment on an opened tailgate is effected by positioning the anchor bar 22 along the far edge of the tailgate 24 and by pushing the side pieces 26 downward against the latch bolts 30, causing the side pieces 26 to latch onto the latch bolts 30. The removal of the anchor bar 22 from the tailgate 24 is effected by pulling the handle of the closure mechanism (not shown), causing the latch bolts 30 to retract inside the tailgate and to release the anchor bar 22.

The preferred dimensions for the angle iron of the C-shaped member 22' are two inches by two inches by one-eight of an inch thick. The inside surfaces of the angle iron are preferably lined with a soft padding material 34 such as foam, felt or the like, to prevent scratching the paint on the tailgate 24 when using the tailgate ramp system of the present invention.

The anchor bar 22 further has an anchor rod 36 affixed to the outside rear surface thereof, at a distance from the outside rear surface. The anchor rod 36 is preferably affixed to the C-shaped member 22 by means of two or more clevises 38 rigidly connected to the outside surface of the longitudinal piece of the C-shaped member 22'. The diameter of the anchor rod 36 is preferably about half-inch, and the gap between the anchor rod 36 and the outside surface of the angle iron 22' is also preferably about a half-inch or slightly more.

The ramp members 20 of the first preferred embodiment are preferably made of preformed metal decking strip having a width of eight inches or more and a depth of one inch or more. Those skilled in the art will appreciate that the ramp members 20 may also be made of wood planks or composite materials provided that these structural members have sufficient strength for supporting the load of an all-terrain-vehicle or other equipment usually transported in the box of a pickup truck.

Each ramp member 20 has a pair of hooks 40 affixed to one end thereof. Each hook 40 is sized to engage with the anchor rod 36 of the anchor bar 22. When the anchor bar 22 is installed on the tailgate, and when the ramp members 20 are pulled out from the truck box, the hooks 40 and readily connected to the anchor rod 36 such that the complete installation of the tailgate ramp system of the first preferred embodiment is easy and efficient.

An anchor bar 46 and ramp members 48 of the second preferred embodiment are illustrated in FIGS. 6, 7 and 8.

The anchor bar 46 of the second preferred embodiment is similar in shape, dimensions and purpose as the anchor bar 22 of the first preferred embodiment. The anchor bar 46 of the second preferred embodiment has a round pin 50 extending inside each of the side portions of the C-shaped member 46'. The anchor bar 46 of the second preferred embodiment is mountable on modern pickup trucks wherein the tailgate has a latching mechanism engaging with a mating pin mounted on the frame of the truck box. The pins 50 on each model of anchor bar 46 are therefor sized and positioned to fit into the latch mechanism of one particular type of pickup truck.

The ramp member 48 of the second preferred embodiment is also preferably made of preformed metal decking strip. The side flanges of the metal section are preferably slotted as illustrated in FIGS. 6 and 7 for engaging with the anchor rod 36 of the anchor bar 22 or 46. The shape of each slot 54 is preferably a slanted Z-shaped slot having a first leg 56 starting from the lower edge of the side flange and extending upwardly, transversely relative to the longitudinal axis of the ramp member. The first leg 56 merges into a second leg 58 extending longitudinally towards the high end of the ramp member 48. The second leg 58 merges into a third leg 60 extending transversely relative to the ramp member and stopping short of the upper edge of the side flange. The width of the slot 54 is preferably about five-eight of an inch such that the slot is easily slid over an anchor rod 36 having a diameter of about half-inch.

The high end of the ramp member is preferably cut at an angle 62 of about between 10° and 30° with a transversal plane of the ramp member. It will be appreciated that the angle 62 preferably corresponds to a typical inclination of the ramp member, such that when the ramp member is being used, the high end of the ramp member 48 is parallel to the outside surface of the angle iron 22'.

When a ramp member 48 of the second preferred embodiment is pulled from inside the box of a pickup truck having the tailgate opened and the anchor bar 50 installed thereon, the slot 54 ultimately drops over the anchor rod 36. The anchor rod 36 slides into the first leg 56. A further pulling on the ramp member 48 causes the anchor rod 36 to slide along the second leg 58 and into the third leg 60. Gravity forces acting on the ramp member 48 causes the third leg 60 to be held captive on the anchor rod 36, thereby preventing any twisting or dislodging of the ramp member 48 during the handling of a load thereon.

Referring now to FIGS. 9–12, there is illustrated therein a ramp member 70 of a third preferred embodiment. The ramp member 70 is also preferably made of preformed metal decking strip and has an upper end trimmed to an angle 62' similar to the angle 62 as previously explained and for the same reasons as spoken of before.

The ramp member 70 has transversal slots 72 across the upper end of both side surfaces. These slots extend from a lower edge of the side surfaces to near the upper edge of the side surfaces. The width of these slots is also about five-eight of an inch for easily engaging with the anchor rod 36.

The ramp member 70 of the third preferred embodiment further has a pair of latch tabs 74 each mounted across the lower end of a respective slot 72 for selectively enclosing the lower end of that slot 72. Each latch tab 74 is mounted on a pivot 76 on one side of the slot 72 and normally lays across the lower end of the slot 72 on a rest pin 78 extending through the side member on the other side of the slot 72.

Each latch tab 74 is freely rotatable upwardly when the ramp member is being connected to the anchor rod 36 for example. The latch tabs 74 are also rotatable manually for removing the ramp member 70 from the anchor rod 36. When the ramp member is in use, however, the latch tabs 74 prevent the ramp member 70 from accidentally lifting or twisting out of its engagement with the anchor rod 36. It will be appreciated that the turning radius 80 of the latch tab 74 is shorter that the length of the slot 72 such that the latch tab 74 is operable when the ramp member 70 is connected the anchor rod 36.

While the above description provides a full and complete disclosure of the preferred embodiments of this invention, various modifications, alternate constructions and equivalents may be employed without departing from the true spirit and scope of the invention. Such changes might involve alternate components, structural arrangements, sizes, operational features or the characteristics of the like. Therefore, the above description and accompanying illustrations should not be construed as limiting the scope of the invention which is defined by the appended claims.

We claim:

1. An anchor bar for installation on a tailgate of a pickup truck when said tailgate is in an open position for retaining a ramp member thereto, said tailgate having a pair of first latch means, one on each side thereof, said anchor bar comprising:

an elongated stem member having means for anchoring said ramp member, and a pair of second latch means corresponding in shape and respective location relative to a length of said stem member to a configuration and spacing of said pair of first latch means relative to a width of said tailgate;

such that when said anchor bar is adapted to be installed on said tailgate, said anchor bar is retainable to said tailgate by an engagement of said second latch means with said first latch means.

2. An anchor bar as claimed in claim 1 wherein each of said first latch means is a retractable latch bolt and each of said second latch means is an opening having dimensions for receiving therein said latch bolt.

3. An anchor bar as claimed in claim 1 wherein each of said first latch means is a pin-latching mechanism and each of said second latch means is a pin engageable in said pin-latching mechanism.

4. An anchor bar as claimed in claim 1 wherein said elongated stem is an angle iron, and said angle iron is at least partly covered with soft padding material for preventing scratching a painted surface of said tailgate.

5. An anchor bar as claimed in claim 1, wherein said means for anchoring said ramp member is a round rod affixed to said elongated stem member by means of at least two clevises connected to said stem member.

6. An anchor bar for retaining a ramp member to the tailgate of a pickup truck, said tailgate having an inside surface, a longitudinal upper edge having a nominal length and thickness, a pair of spaced apart transversal edges, and a pair of first latch means, one on each of said transversal edges, said anchor bar having:

a C-shaped structure comprising a stem member and two arm members pointing at right angles from said stem member, one at each extremity of said stem member, and means for anchoring a ramp member affixed to said stem member;

said stem member having nominal dimensions corresponding to said nominal length and thickness of said longitudinal upper edge, and each of said arm members having a nominal surface for partly covering one of said transversal edges, whereby said C-shaped structure is mountable over said longitudinal upper edge of said tailgate for at least partly enclosing said longitudinal upper edge and said pair of transversal edges;

each of said arm members further having one of a pair of second latch means corresponding in shape and respective location relative to a length of said stem member to a configuration and spacing of one of said pair of first latch means relative to a width of said tailgate;

such that when said anchor bar is adapted to be installed on said tailgate, said anchor bar is retainable to said tailgate by an engagement of said second latch means with said first latch means.

7. An anchor bar as claimed in claim 6 wherein each of said first latch means is a retractable latch bolt and each of said second latch means is an opening having dimensions for receiving therein said latch bolt.

8. An anchor bar as claimed in claim 6 wherein each of said first latch means is a pin-latching mechanism and each of said second latch means is a pin engageable in said pin-latching mechanism.

9. An anchor bar as claimed in claim 6, wherein said stem member and said arm members are at least partly covered with soft padding material for preventing scratching a painted surface of said tailgate.

10. An anchor bar as claimed in claim 6, wherein said means for anchoring said ramp member is a round rod affixed to said stem member by means of at least two clevises connected to said stem member.

11. An anchor bar as claimed in claim 6, wherein said C-shaped structure is made of angle iron for partly covering said inside surface of said tailgate when said anchor bar is installed over said tailgate.

12. An anchor bar as claimed in claim 7, wherein each of said openings is positioned near a far end of one of said arm members relative to said stem member.

13. A tailgate ramp system for installation over the tailgate of a pickup truck, said tailgate having an inside surface, a longitudinal upper edge having a nominal length and thickness, a pair of spaced apart transversal edges, and a pair of first latch means, one on each of said transversal edges, said tailgate ramp system comprising:

at least one elongated ramp member having upper and lower ends and hook means on said upper end;

a C-shaped structure comprising a stem member and two arm members pointing at right angles from said stem member, one at each extremity of said stem member, and a round rod affixed to said stem member by means of at least two clevises connected to said stem member for engagement with said hook means on said upper end of said ramp member;

said stem member having nominal dimensions corresponding to said nominal length and thickness of said longitudinal upper edge, and each of said arm members having a nominal surface for partly covering one of said transversal edges, whereby said C-shaped structure is mountable over said longitudinal upper edge of said tailgate for at least partly enclosing said longitudinal upper edge and said pair of transversal edges, said stem member and said arm members being at least partly covered with soft padding material for preventing scratching a painted surface of said tailgate;

each of said arm members further having one of a pair of second latch means corresponding in shape and respective location relative to a length of said stem member to a configuration and spacing of one of said pair of first latch means relative to a width of said tailgate;

such that when said anchor bar is adapted to be installed on said tailgate, said anchor bar is retainable to said tailgate by an engagement of said second latch means with said first latch means.

14. A tailgate ramp system as claimed in claim 13 wherein said first latch means is a pair of retractable latch bolts protruding from said transversal edges, and said second latch means is a pair of openings through said arm members, and shapes and locations of said openings relative to said stem member correspond to configurations and spacing of said latch bolts relative to said longitudinal upper edge.

15. A tailgate ramp system as claimed in claim 13 wherein said first latch means is a pair of pin-latching mechanisms, and said second latch means is a pair of pins extending from said arm members and shapes and locations of said pins relative to said stem member correspond to configurations and spacing of said pin-latching mechanisms of said tailgate relative to said longitudinal upper edge.

16. A tailgate ramp system as claimed in claim 13 wherein said ramp member is made of preformed metal decking strips having a tread surface and two flanges enclosing said tread surface and extending perpendicularly relative to said tread surface.

17. A tailgate ramp system as claimed in claim 16, wherein said hook means is a slanted Z-shaped slot in each of said flanges.

18. A tailgate ramp system as claimed in claim 16, wherein said upper end of said ramp member forms an angle of about between 10° and 30° with a plane perpendicular to said tread surface.

19. A tailgate ramp system as claimed in claim 18 wherein said hook means is a pair of slots in said flanges near said upper end, and extending parallel to said upper end.

20. A tailgate ramp system as claimed in claim 19 wherein each of said slots further has latch tabs mounted across a bottom end thereof for selectively closing said bottom end of said slot and for preventing said ramp member from accidentally lifting or twisting out of its engagement with said round rod, when said ramp member is adapted to be anchored to said round rod.

* * * * *